United States Patent
Andgart et al.

(10) Patent No.: US 8,594,212 B2
(45) Date of Patent: Nov. 26, 2013

(54) IQ-IMBALANCE COMPENSATION IN PRESENCE OF CARRIER OFFSET

(75) Inventors: Niklas Andgart, Södra Sandby (SE); Michal Stala, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 13/001,726

(22) PCT Filed: Jun. 30, 2008

(86) PCT No.: PCT/EP2008/058383
§ 371 (c)(1),
(2), (4) Date: Feb. 21, 2011

(87) PCT Pub. No.: WO2010/000297
PCT Pub. Date: Jan. 7, 2010

(65) Prior Publication Data
US 2011/0135036 A1  Jun. 9, 2011

(51) Int. Cl.
*H04K 1/10* (2006.01)
*H04L 27/28* (2006.01)

(52) U.S. Cl.
USPC .......................................... 375/260; 375/316

(58) Field of Classification Search
USPC .................................. 375/260, 316
See application file for complete search history.

(56) References Cited

U.S. PATENT DOCUMENTS

| | | | |
|---|---|---|---|
| 7,079,597 B1 * | 7/2006 | Shiraishi et al. | 375/326 |
| 2005/0276354 A1 * | 12/2005 | Su et al. | 375/326 |
| 2007/0058755 A1 * | 3/2007 | Husted | 375/332 |
| 2008/0159442 A1 * | 7/2008 | Tanabe et al. | 375/324 |

OTHER PUBLICATIONS

Tubbax, J. et al; "Joint compensation of IQ imbalance and frequency offset in OFDM systems", IEEE, 2003, vol. 4, pp. 2365-2369, Globecom 2003.*
Tandur et al; "Digital Compensation of RF Imperfections for Broadband Wireless Systems", IEEE synposium 14th, Nov. 2007, pp. 1-5.*
Yan, F. et al. "Carrier Fequency Offset Estimation and I/O Imbalance Compensation for OFDM Systems." Hindawi Publishing Corporation, EURASIP Journal on Advances in Signal Processing, vol. 2007, Article ID 45364, 11 pages, Jan. 11, 2007.
Xing, G. et al. "Frequency Offset and I/Q Imbalance Compensation for OFDM Direct-Conversion Receivers." 2003 IEEE International Conference on Acoustics, Speech and Signal Processing, Hong Kong, Apr. 6-10, 2003.

(Continued)

*Primary Examiner* — Qutbuddin Ghulamali
(74) *Attorney, Agent, or Firm* — Coats & Bennett P.L.L.C.

(57) ABSTRACT

An arrangement for processing a received wireless communication signal is disclosed. The arrangement comprises a frequency offset compensation unit adapted to apply a frequency offset compensation to the received wireless communication signal, determination circuitry adapted to determine one or more adjustment values associated with the frequency offset compensation, and an FFT-unit adapted to transform the frequency offset compensated received signal to a frequency domain. The arrangement also comprises an IQ-imbalance estimator adapted to estimate an IQ-imbalance, and an IQ-imbalance compensation unit adapted to perform IQ-imbalance compensation of the received wireless communication signal based on the estimated IQ-imbalance. At least one of the IQ-imbalance estimator and the IQ-imbalance compensation unit is adapted to base its operation on the one or more adjustment values. Corresponding method and computer program product are also disclosed.

13 Claims, 6 Drawing Sheets

(56) References Cited

OTHER PUBLICATIONS

Tandur, D. et al. "Joint Adaptive Compensation of Transmitter and Receiver IQ Imbalance Under Carrier Frequency Offset in OFDM-Based Systems." IEEE Transactions on Signal Processing, vol. 55, No. 11, Nov. 2007.

Tubbax, J. et al. "Joint Compensation of IQ Imbalance and Frequency Offset in OFDM Systems." 2003 IEEE Global Telecommunications Conference, San Francisco, CA, US, Dec. 1-5, 2003.

* cited by examiner

IQ-IMBALANCE COMPENSATION IN PRESENCE OF CARRIER OFFSET

TECHNICAL FIELD

The present invention relates generally to the field of compensating for in-phase/quadrature imbalance (IQ-imbalance). More particularly, it relates to IQ-imbalance compensation of a received wireless communication signal.

BACKGROUND

Many Orthogonal Frequency Division Multiplexing (OFDM)-based systems, such as the Universal Mobile Telecommunications Standard Long Term Evolution (UMTS LTE), require that receivers of the system are able to process a received OFDM-signal to acquire a relatively high signal-to-noise ratio (SNR). The receiver should be able to process the signal without introducing impairments or noise (or at least without introducing impairments or noise that are of a severe nature). Further, the receiver should be able to adjust for impairments and/or noise introduced by the channel over which the received OFDM-signal was transmitted.

Furthermore, many OFDM-based systems employ complex transmission schemes, such as Multiple-Input Multiple-Output (MIMO) and/or large signal constellations, which may further increase the demands on the receiver.

To be able to meet such demands of high SNR in receivers operating in OFDM-systems, an expensive radio design may be required. Alternatively (or additionally) methods may be employed that are able to handle radio imperfections resulting from a non-optimal radio design.

One radio imperfection is IQ-imbalance. IQ-imbalance is one of the more limiting radio imperfections, and is thus important to dispose of or at least suppress.

IQ-imbalance may be generated by anything that affects the in-phase (I) and quadrature (Q) components of the received OFDM-signal differently. One example source of IQ-imbalance is a local oscillator of a receiver or a transmitter (or both). Another example source of IQ-imbalance is mismatch between one or more blocks in the respective I- and Q-paths of the receiver chain. Examples of blocks that may experience such mismatch are amplifiers and channel filters.

IQ-imbalance can be modeled, in the receiver, as a difference in phase and amplitude between the in-phase and quadrature oscillator components (i.e. the carriers). After down-converting the received signal to a baseband signal in down-conversion mixers, this difference in phase and amplitude results in a leakage between the in-phase and quadrature components of the baseband signal. Thus, the real part of the symbols will affect the imaginary part of the symbols, and vice versa;

$$y^{IQ}[n]=y[n]+\rho y^*[n], \quad (1)$$

where * denotes conjugate, $\rho$ represents the IQ-imbalance and is a factor that depends on the phase and amplitude mismatch (for example in the local oscillator or of blocks in the respective I- and Q-paths of the receiver chain), $y[n]$ is what the received signal would have been if there was no IQ-imbalance, and $y^{IQ}[n]$ is the actually received signal.

In OFDM, data is transmitted in parallel on a number of sub-carriers (or sub-carrier frequencies), which may be efficiently implemented by using an inverse fast Fourier transform (IFFT) in the transmitter, and a fast Fourier transform (FFT) in the receiver. If the size of the FFT is N, then N samples at the output of the FFT are referred to as an OFDM-symbol (i.e. a frequency domain OFDM-symbol).

Each OFDM-symbol thus comprises data on N sub-carriers. Each such piece of data will be referred to as a symbol (in contrast to an OFDM-symbol), and may comprise a pilot symbol or an information symbol. In UMTS LTE, a symbol as described above may be denoted a resource element, and a pilot symbol may be denoted a reference signal.

In an OFDM-based system, the baseband signal is thus transformed, in the receiver, to a frequency domain signal and this is commonly achieved by applying an FFT to the baseband signal. When transformed to the frequency domain, the IQ-imbalance affects the frequency domain signal in frequency pairs. Thus, the symbols on sub-carrier N−k leak into sub-carrier k and vice versa. This may be expressed by the following frequency domain expression:

$$Y_{IQ}(k)=Y(k)+\rho Y^*(N-k), \quad (2)$$

where $Y(k)$ is what the received signal would have been if there was no IQ-imbalance, and $Y_{IQ}(k)$ is the actually received signal. It may be noted that the notation of sub-carrier N−k is equivalent to sub-carrier −k. This is due to the N-periodicity of the FFT. Throughout this application, sub-carrier N−k will be denoted the mirror sub-carrier of sub-carrier k, and sub-carriers k and N−k will be denoted a frequency pair.

The leakage from a sub-carrier to another sub-carrier is a form of inter-carrier interference (ICI), and will degrade the SNR in the receiver. Thus, in order to achieve a high SNR while allowing for a less expensive radio design, it may be desirable to measure (or estimate) the IQ-imbalance and perform compensation on the received signal for the estimated IQ-imbalance. For example, the value $\rho$ can be estimated. The estimated value $\hat{\rho}$ can then be used to perform compensation on the received signal. The estimated value $\hat{\rho}$ may, for example, be determined based on known pilot values and known channel values (e.g. channel estimates). If the value $\hat{\rho}$ is accurately estimated, the compensation will cancel the leakage from the mirror sub-carrier completely.

Another imperfection experienced in wireless communication systems is frequency offset. A frequency offset experienced at a communication receiver may, for example, be due to mismatches between transmitter and receiver oscillators (which may in turn be caused by e.g. component mismatch, temperature variations, etc.) or Doppler phenomena.

Frequency offset compensation may be achieved in different ways. For example, the frequency of the local oscillator may be adjusted based on a detected or estimated frequency offset. Another possibility is to perform digital frequency offset compensation. Digital offset compensation may be achieved via a multiplication of the received baseband signal with a phase ramp, e.g. $\exp(j2\pi\hat{\upsilon}n/N)$, where $\hat{\upsilon}$ is the normalized estimated frequency offset. A frequency offset compensator unit using this approach is commonly referred to as a digital rotator.

When digital frequency offset compensation is applied to the baseband signal, equations (1) and (2) will no longer be valid. Thus, if conventional IQ-imbalance estimation and compensation approaches were applied to such a signal, the result would not be optimal. The value $\hat{\rho}$ would not be accurately estimated. Further, even if the value $\hat{\rho}$ were accurately known, the compensation itself would not be optimal if conventional compensation techniques were used.

Similar problems may arise in wireless communication systems (and in receivers for such systems) not based on OFDM, but, for example, on SC-FDMA (Single Carrier Frequency Division Multiple Access).

Thus, there is a need for improved methods of and arrangements for IQ-imbalance compensation of a received wireless communication signal when frequency offset compensation is applied. Further, there is a need for improved methods of and arrangements for estimating IQ-imbalance in such cases.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods of and arrangements for IQ-imbalance estimation and compensation of a received wireless communication signal.

According to a first aspect of the invention, this is achieved by a method of processing a received wireless communication signal, suitable for use in a communication receiver. The method comprises applying frequency offset compensation to produce a frequency offset compensated received signal, determining one or more adjustment values associated with the frequency offset compensation, and transforming the frequency offset compensated received signal to a frequency domain, wherein the frequency domain comprises a plurality of sub-carrier frequencies. The method also comprises estimating an in-phase/quadrature imbalance (IQ-imbalance), and performing IQ-imbalance compensation of the received wireless communication signal based on the estimated IQ-imbalance. According to the method, at least one of the step of estimating the IQ-imbalance and the step of performing IQ-imbalance compensation is performed based on the one or more adjustment values.

The IQ-imbalance may be a property associated with a receiver of the wireless communication signal.

In some embodiments, the IQ-imbalance compensation is performed using a feed forward approach. In other embodiments, the IQ-imbalance compensation is performed using a feedback approach.

In some embodiments, the step of estimating the IQ-imbalance and the step of performing IQ-imbalance compensation may be performed after the step of transforming the frequency offset compensated received signal and may be based on the one or more adjustment values. In some embodiments, the IQ-imbalance compensation is performed using a feed forward approach.

In some embodiments, the step of estimating the IQ-imbalance may be performed after the step of transforming the frequency offset compensated received signal and may be based on the one or more adjustment values. The step of performing IQ-imbalance compensation may be performed prior to the step of transforming the frequency offset compensated received signal and after the step of applying frequency offset compensation and may be based on the one or more adjustment values.

In some embodiments, the step of performing IQ-imbalance compensation may comprise adjusting the estimated IQ-imbalance based on the one or more adjustment values and performing the IQ-imbalance compensation based on the adjusted estimated IQ-imbalance.

In some embodiments, the step of estimating the IQ-imbalance may be performed after the step of transforming the frequency offset compensated received signal and may be based on the one or more adjustment values. The step of performing IQ-imbalance compensation may be performed prior to the step of applying frequency offset compensation and may not be based on the one or more adjustment values.

In some embodiments, the step of estimating the IQ-imbalance may comprise defining a residual IQ-imbalance by a numerator and a denominator and estimating the numerator and denominator.

In some embodiments, the step of estimating the IQ-imbalance may comprise estimating the IQ-imbalance based on at least the one or more adjustment values, information related to a first symbol of a first sub-carrier frequency and information related to a second symbol of a second sub-carrier frequency, wherein the second sub-carrier frequency is a mirror sub-carrier frequency to the first sub-carrier frequency.

In some embodiments, the step of estimating the IQ-imbalance may comprise determining estimated channel values for at least the first sub-carrier frequency, the first sub-carrier frequency having a pilot symbol, and estimating the IQ-imbalance based on at least the pilot symbol, the at least one determined estimated channel value, information related to the second symbol, and at least one of the one or more adjustment values.

In some embodiments, the step of estimating the IQ-imbalance may comprise estimating the IQ-imbalance based on information related to a number of symbols of sub-carrier frequencies being neighboring sub-carrier frequencies to the mirror sub-carrier frequency.

In some embodiments, the step of estimating the IQ-imbalance may comprise estimating the IQ-imbalance based on a plurality of pilot symbols and information related to symbols of corresponding mirror sub-carrier frequencies.

In some embodiments, the step of estimating the IQ-imbalance may be performed prior to the step of transforming the frequency offset compensated received signal and after the step of applying frequency offset compensation and may be based on the one or more adjustment values.

In some embodiments, the step of estimating the IQ-imbalance may be performed prior to the step of applying frequency offset compensation and may not be based on the one or more adjustment values.

In some embodiments, the wireless signal may be an OFDM-signal and each of the one or more adjustment values may be associated with a respective OFDM-symbol of the received OFDM-signal and may comprise a complex number associated with the respective OFDM-symbol. Performing at least one of the step of estimating the IQ-imbalance and the step of performing IQ-imbalance compensation based on the one or more adjustment values may comprise a multiplication with a first function of the complex number. The step of applying frequency offset compensation may comprise digital rotation. The complex number may be a second function of a phase of the digital rotation corresponding to a particular sample of the respective OFDM-symbol. The second function may comprise a doubling of the phase of the digital rotation corresponding to the particular sample.

The step of determining the one or more adjustment values may comprise using a digital rotator to generate the complex number during a cyclic prefix of the respective OFDM-symbol or of an adjacent OFDM-symbol.

A second aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A third aspect of the invention is an arrangement for processing a received wireless communication signal. The arrangement comprises a frequency offset compensation unit adapted to apply a frequency offset compensation to the received wireless communication signal to produce a frequency offset compensated received signal, determination circuitry adapted to determine one or more adjustment values associated with the frequency offset compensation, an FFT-unit adapted to transform the frequency offset compensated received signal to a frequency domain, wherein the frequency domain comprises a plurality of sub-carrier frequencies, an IQ-imbalance estimator adapted to estimate an IQ-imbalance, and an IQ-imbalance compensation unit adapted to perform IQ-imbalance compensation of the received wireless communication signal based on the estimated IQ-imbalance. At least one of the IQ-imbalance estimator and the IQ-imbalance compensation unit is adapted to base its operation on the one or more adjustment values.

In some embodiments, the IQ-imbalance estimator may be adapted to estimate the IQ-imbalance based on at least the one or more adjustment values, information related to a first symbol of a first sub-carrier frequency and information related to a second symbol of a second sub-carrier frequency, wherein the second sub-carrier frequency is a mirror sub-carrier frequency to the first sub-carrier frequency. The arrangement may further comprise a channel estimator adapted to determine estimated channel values for at least the first sub-carrier frequency, the first sub-carrier frequency having a pilot symbol, and the IQ-imbalance estimator may be adapted to estimate the IQ-imbalance based on at least the pilot symbol, the at least one determined estimated channel value, information related to the second symbol, and at least one of the one or more adjustment values.

In some embodiments, the wireless signal may be an OFDM-signal and the determination circuitry may be adapted to determine each of the one or more adjustment values to be associated with a respective OFDM-symbol of the received OFDM-signal and to comprise a complex number associated with the respective OFDM-symbol. The operation of at least one of the IQ-imbalance estimator and the IQ-imbalance compensation unit may comprise a multiplication with a first function of the complex number. The frequency offset compensation unit may comprise a digital rotator. The determination circuitry may be further adapted to determine the complex number as a second function of a phase of the digital rotator corresponding to a particular sample of the respective OFDM-symbol. The second function may comprise a doubling of the phase of the digital rotator corresponding to the particular sample. The digital rotator may comprise the determination circuitry.

In some embodiments, the third aspect of the invention may additionally have features identical with or corresponding to any of the various features as explained above for the first aspect of the invention.

A fourth aspect of the invention is an electronic communication device comprising a wireless communication receiver, which comprises the arrangement according to the third aspect of the invention.

One of the advantages of embodiments of the invention is that accurate estimation of IQ-imbalance is possible in receivers where frequency offset compensation is applied.

Another advantage with embodiments of the invention is that accurate IQ-imbalance compensation is possible in receivers where frequency offset compensation is applied.

Another advantage with embodiments of the invention is that IQ-imbalance estimation and compensation schemes are provided that are robust against frequency offset compensation.

Another advantage with embodiments of the invention is that a cost-effective implementation is provided. For example, a digital rotator for frequency offset compensation may be utilized to calculate the one or more adjustment values. Alternatively or additionally, a residual IQ-imbalance may be defined by a numerator and a denominator to simplify the estimation process.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Figure 1:
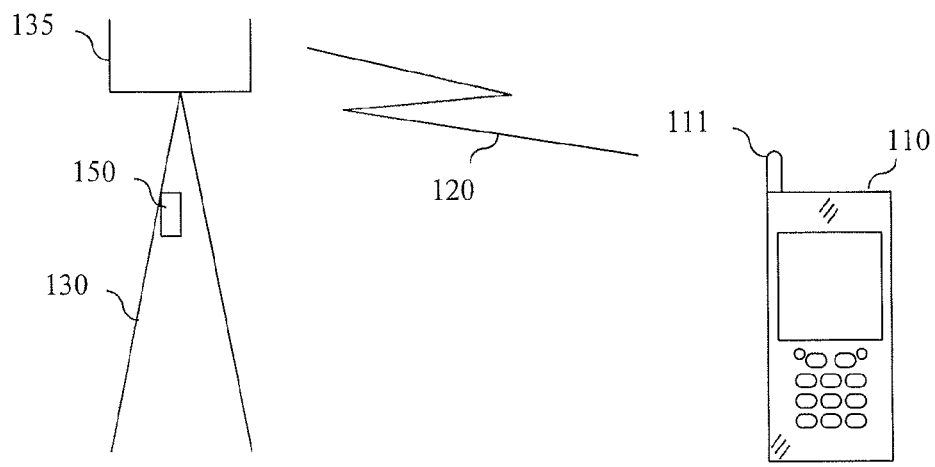
FIG. 1 is a schematic front view of a mobile terminal connected, through a radio link, to a base station site, wherein the mobile terminal may comprise arrangements according to some embodiments of the invention.

In the following, embodiments of the invention will be described with reference to OFDM-systems and receivers for such systems. It should be understood, however, that embodiments of the invention are equally applicable to other wireless communication systems and receivers, such as, for example, SC-FDMA-based systems and receivers.

Both frequency offset compensation and IQ-imbalance compensation may be non-linear operations. Therefore, the order in which they are performed may be crucial and may affect which way is optimal for performing the frequency offset compensation and/or the IQ-imbalance compensation. If both the IQ-imbalance estimation and compensation are performed in the time domain, and if there are no constraints relating, for example, to already implemented blocks of the receiver (e.g. a radio with a built-in IQ-imbalance compensator and a built in frequency offset compensator but with no IQ-imbalance estimator), then the IQ-imbalance estimation and compensation may be placed freely so that the IQ-imbalance estimation and compensation are performed before the frequency offset compensation and the conventional expressions of equations (1) and (2) are valid.

However, there may be constraints to a receiver implementation, such as the one mentioned above. Furthermore it may be attractive to perform at least the IQ-imbalance estimation in the frequency domain because there exist a symmetry between sub-carrier frequency pairs as will be explained in the following. The IQ-imbalance compensation may also benefit from this symmetry. In the time domain, each sample comprises data related to pilot and information symbols of the entire OFDM-symbol (in addition to noise and other interference). In the frequency domain, each sub-carrier frequency comprises data related to the pilot or information symbol of that particular sub-carrier and data of the corresponding mirror sub-carrier (in addition to noise and other interference). This simplifies the IQ-imbalance estimation and compensation as will be explained in the following.

However, if the IQ-imbalance estimation and/or compensation is performed after the frequency offset compensation, care must be taken so that the performance of the IQ-imbalance estimation and compensation is not adversely affected by the frequency offset compensation.

In the following, example embodiments of the invention will be described in which IQ-imbalance of a received OFDM-signal is compensated for. Embodiments of the invention take into account one or more adjustment values associated with a frequency offset compensation applied to the received OFDM-signal. Some embodiments use the one or more adjustments values in estimation of the IQ-imbalance, some embodiments use the one or more adjustments values when compensating for the IQ-imbalance based on an IQ-imbalance estimate, and some embodiments use the one or more adjustments values both in estimation of and in compensation for the IQ-imbalance.

When digital frequency offset compensation is applied to the baseband signal, equations (1) and (2) will no longer be valid since the frequency offset compensation introduced by, for example, a digital rotator may change the manner in which the IQ-imbalance affects the received signal. Equation (1) may, for example, be transformed into $$y^{IQ}[n]=y[n]+\rho\exp(j2\pi(2\hat{v}(n+m_s)/N)y^*[n], \quad (3)$$

where $m_s$ is the index of the first sample of OFDM-symbol s, and equation (2) may, for example, transform into $$Y_{IQ}(k)=Y(k)+\rho\theta_{(s)}Y^*(N-k+2\hat{v}), \quad (4)$$

where $\theta_{(s)}=\exp(j2\pi(2\hat{v})m_s/N)$ corresponds to twice the phase value of the phase ramp used by the rotator at the first sample of OFDM-symbol s.

Thus, when the frequency is adjusted with, for example, a digital rotator, the IQ-imbalance parts of equations (3) and (4) may, for each symbol, rotate around origin with an amount depending on the estimated frequency offset used in the frequency offset compensation. Even if the frequency offset compensation only comprises very small rotations, the approaches to IQ-imbalance compensation where no account is taken of the frequency offset compensation will cease to function properly.

Furthermore, when frequency offset compensation is present, the influence of the IQ-imbalance is no longer restricted to cause interference between the two mirrored sub-frequencies of a frequency pair. In these cases, the IQ-imbalance part has an argument $2\hat{v}$, which causes the symbols of each sub-carrier to slide slightly off the OFDM frequency grid. This in turn causes IQ-imbalance leakage between all sub-carriers;

$$Y_{IQ}(k) = Y(k) + \rho\theta_{(s)}\sum_l Y^*(l)\frac{\exp(j2\pi(-l+k-2\hat{v}))-1}{N(\exp(j2\pi(-l+k-2\hat{v})/N)-1)}. \quad (5)$$

For a small frequency offset ($|\hat{v}|\ll 1$), the sum in equation (5) is dominated by the term for l=N−k and the scaling factor at the end of each term of the sum in equation (5) is approximately equal to 1. Thus, an approximate expression for equation (5) is $$Y_{IQ}(k)\approx Y(k)+\rho\theta_{(s)}Y^*(N-k). \quad (6)$$

Thus, for relatively small frequency offset compensations, equation (6) may be used as a basis for determining how IQ-imbalance estimation and compensation should be performed. For large frequency offset compensations, however, equation (5) should be reverted to for determining how IQ-imbalance estimation and compensation should be performed, as will be demonstrated in connection to FIG. 6. In equation (5), the number of terms used in the summation may be a variable depending of the frequency offset compensation. Preferably, the terms being neighbors to the l=N−k term (the mirror sub-frequency) are used.

Embodiments of the invention utilize the estimated frequency offset used for frequency offset compensation to de-rotate the components of the IQ-imbalance estimate, and also to properly rotate the entire IQ-imbalance estimate when it is used in IQ-imbalance compensation.

IQ-imbalance of a received OFDM-signal may be estimated based on pilot symbols, channel values and, in some embodiments, estimates of transmitted symbols.

Estimating the value ρ accurately requires knowledge of the channel as well as of the transmitted symbols for each frequency pair used in the estimation. Channel information could, for example, be obtained from a channel estimator. Knowledge of transmitted symbols is commonly obtained by the use of pilot symbols. Thus, to be able to perform an accurate estimation of the value ρ, pilots need to be distributed on both sub-carriers of each frequency pair used in the estimation.

However, pilot symbol distribution is in general defined in the standard to be applied. Thus, access to pilot information on frequency pairs depends on how the pilot distribution is defined in the standard. In UMTS LTE, for example, the pilots are not placed on mirror frequency pairs.

When no frequency offset compensation is present, the IQ-imbalance, represented by the value ρ, may be estimated as $$\hat{\rho} = \frac{\sum_k H(N-k)P(N-k)(Y_{IQ}(k)-H(k)P(k))}{\sum_k |P(N-k)|^2|H(N-k)|^2}, \quad (7)$$

where P(k) and P(N−k) denote known pilot values of a frequency pair, and H(k) and H(N−k) denotes known channel values.

In general, the channel values are not known, and must be replaced by estimates $\hat{H}(k)$ and $\hat{H}(N-k)$.

In some embodiments, the IQ-imbalance is estimated based on one or more frequency pairs, where pilot symbols are only available on one sub-carrier of a frequency pair. In such embodiments, information relating to the other (mirror) sub-carrier of the frequency pair may be used in the estimation. In some embodiments, the information relating to the mirror sub-carrier may be an estimate of the symbol transmitted on the mirror sub-carrier of the frequency pair. In some embodiments, the information relating to the mirror sub-carrier may be a received symbol of the mirror sub-carrier of the frequency pair.

The estimate of the transmitted symbols may be achieved in various ways. For example, the estimate may not be explicitly calculated, but is implicit in the IQ-imbalance estimation. In some embodiments, the estimate is the received symbol divided by a channel estimate and a soft symbol estimate results. The estimate may be calculated according to $$\hat{S}(N-k) = \frac{Y_{IQ}(N-k) - \tilde{\rho}(\hat{H}(k)P(k))^*}{\hat{H}(N-k)}. \tag{8}$$

An old estimation of $\rho$ may, for example, be used as $\tilde{\rho}$. If $\tilde{\rho}$ is set to zero the special case $\hat{S}(N-k)=Y_{IQ}(N-k)/\hat{H}(N-k)$ results. In some embodiments, a hard decision is taken regarding the transmitted symbol and used as an estimate. That is, the estimate of the transmitted information symbol may be generated through a decision directed approach. In these embodiments, a decision $\hat{S}(N-k)$ is taken with regard to the transmitted symbol. In some of these embodiments, the decision is made based on $Y_{IQ}(N-k)/\hat{H}(N-k)$. In yet some embodiments, the received signal is decoded and the estimate of the transmitted information symbol $\hat{S}(N-k)$ may be generated through re-generating the corresponding supposedly sent signal from the decoded signal and used to provide an estimate of the transmitted symbol.

If, for example, no pilot is available on sub-carrier N–k, then P(N–k) may be replaced by an estimate of the transmitted symbol $\hat{S}(N-k)$, and the IQ-imbalance estimation would be represented as $$\hat{\rho} = \frac{\sum_k \hat{H}(N-k)\hat{S}(N-k)(Y_{IQ}(k) - \hat{H}(k)P(k))}{\sum_k |\hat{S}(N-k)|^2 |\hat{H}(N-k)|^2} \tag{9}$$

It is possible to do the opposite substitution, i.e. replacing P(k) by an estimate of the transmitted symbol $\hat{S}(k)$, $$\hat{\rho} = \frac{\sum_k \hat{H}(N-k)P(N-k)(Y_{IQ}(k) - \hat{H}(k)\hat{S}(k))}{\sum_k |P(N-k)|^2 |\hat{H}(N-k)|^2}. \tag{10}$$

However, in such an embodiment, using an estimate of the transmitted symbol achieved by dividing the received symbol by a channel estimate may be an inferior solution. (Since, if substituting $\hat{S}(k)$ by $Y_{IQ}(k)/\hat{H}(k)$ in equation (10), the expression becomes zero.) Using any other estimate of the transmitted symbol may be used though. Alternatively, $\hat{S}(k)$ may be set to zero in (10) and the IQ-imbalance estimation would result from $$\hat{\rho} = \frac{\sum_k \hat{H}(N-k)P(N-k)Y_{IQ}(k)}{\sum_k |P(N-k)|^2 |\hat{H}(N-k)|^2}, \tag{11}$$

thus relying on the zero-mean of the data signal S(k). This IQ-imbalance estimate will, however, be less accurate, since the data signal S(k) is not modeled and thus influences the IQ-imbalance estimate as noise. It is also noted that this IQ-imbalance estimate improves with the measuring time due to the reliance on the zero-mean of the data signal.

Whether to use equation (9), (10) or (11) may also depend on the presence or not of information data symbols on the mirror frequencies. If no information data is sent on some frequency blocks, these frequencies are referred to as quiet frequencies. However, pilots may still be present even though no information data is transmitted (depending on the communication standard in use). If, for example, N–k belongs to a range of quiet frequencies, then equation (10) or (11) may be preferable, while equation (9) may be preferable if k belongs to a range of quiet frequencies.

If the estimate $\hat{S}(N-k)=Y_{IQ}(N-k)/\hat{H}(N-k)$ of the transmitted information symbol is used, the IQ-imbalance estimation of equation (9) may be expressed as $$\hat{\rho} = \frac{\sum_k Y_{IQ}(N-k)(Y_{IQ}(k) - \hat{H}(k)P(k))}{\sum_k |Y_{IQ}(N-k)|^2}. \tag{12}$$

Thus, the actual estimate of the transmitted information symbol need not be calculated, but is implicit in the IQ-imbalance estimation of equation (12).

Estimating the IQ-imbalance may, in some embodiments, comprise using the Synchronization CHannel (SCH) of UMTS LTE. It is noteworthy that the SCH has symmetrically placed pilots, i.e. pilots are placed on mirror sub-carriers. This gives the advantage that the IQ-imbalance may be estimated based on pilot symbols and channel values alone and no estimates of transmitted symbols have to be used.

When no frequency offset compensation is present, the estimated value $\hat{\rho}$ can be used for compensation, either of the time domain signal or of the frequency domain signal. If performed on the frequency domain signal, the compensation may comprise $$Y_{comp}(k)=Y_{IQ}(k)-\hat{\rho}Y^*_{IQ}(N-k). \tag{13}$$

If $\hat{\rho}$ is estimated accurately, this operation will cancel the leakage from the mirror sub-carrier N–k.

Now, when frequency offset compensation is present, embodiments of the invention suggest that equations (7), (9), (10), (11) and (12) are adjusted using the adjustment value $\theta_{(s)}$. For example, equation (7) may be adjusted to $$\hat{\rho} = \frac{\sum_k H(N-k)P(N-k)(Y_{IQ}(k) - H(k)P(k))\theta^*_{(s)}}{\sum_k |P(N-k)|^2 |H(N-k)|^2}, \tag{14}$$

and similarly for equations (9), (10), (11) and (12). The multiplication with the adjustment value aims at removing the complex rotation of the numerator that is due to the applied frequency offset compensation.

The summations in equation (14) may be over several sub-carrier frequencies of the same OFDM-symbol and/or over several OFDM-symbols. The adjustment value may be constant over the different sub-carrier frequencies of the same OFDM-symbol and may change between different OFDM-symbols. The more information that is collected in time and frequency by the summations, the more robust the IQ-imbalance estimation gets against noise and fading dips. On the other hand, if the summations cover a large time span, an estimation delay is introduced which may be undesirable. Several estimations may also be calculated according to equation (14), where each estimation covers a subset of the sub-carrier frequencies. In this way, frequency dependent IQ-imbalance may be estimated (and thus compensated for).

The more frequency pairs that are used in the summations in equation (14), the more complex the IQ-imbalance estimation becomes. To reduce the complexity, a smaller number of samples can be used in accordance with some embodiments of the invention. Thus, of the available pilot symbols in an OFDM-symbol (or in several OFDM-symbols) only a subset may be used for the IQ-imbalance estimation. In these embodiments, the pilot symbols (and hence the frequency pairs) to be used in the IQ-imbalance estimation may, for example, be chosen according to a pseudo-random pattern over the available time and frequency span.

Embodiments of the invention also suggest that, when frequency offset compensation is present; equation (13) should be adjusted using the adjustment value $\theta_{(s)}$. For example, equation (13) may be adjusted to $$Y_{comp}(k)=Y_{IQ}(k)-\hat{\rho}\theta_{(s)}Y^*_{IQ}(N-k), \quad (15)$$

when the IQ-imbalance compensation is performed in the frequency domain. If the IQ-imbalance compensation is performed after the AFC in the time domain, the compensation may be expressed as $$y_{comp}[n]=y^{IQ}[n]-\hat{\rho}\exp(j2\pi(2\hat{v})(n+m_s)/N)(y^{IQ}[n])^* =$$

$$=y^{IQ}[n]-\hat{\rho}\theta_{(s)}\exp(j2\pi(2\hat{v})n/N)(y^{IQ}[n])^*. \quad (16)$$

If the IQ-imbalance compensation is performed before the AFC in the time domain, the compensation may be expressed as $$y_{comp}[n]=y^{IQ}[n]-\hat{\rho}(y^{IQ}[n])^*. \quad (17)$$

As before, the adjustment value may be different for different OFDM-symbols.

Thus, the IQ-imbalance compensation may be performed either pre-FFT or post-FFT. Further it may be performed in a feedback or feed forward manner.

If the compensation is to be performed in a feedback loop, a previous IQ-imbalance estimate $\rho_0$ may be combined with the new (residual) IQ-imbalance estimate $\Delta\rho$ to improve the result. This is due to that the IQ-imbalance is estimated based on an already IQ-imbalance compensated signal (compensated with a previous IQ-imbalance estimate), and the new IQ-imbalance estimate represents an estimate of the residual IQ-imbalance. In some embodiments, the combination of new and previous IQ-imbalance estimates may be performed as $\hat{\rho}=(\rho_0+\Delta\rho\cdot\alpha)/(1+\Delta\rho\cdot\rho^*_0\alpha)$, and used in, for example, any of equations (13), (15), (16) or (17). The factor $\alpha$ ($0<\alpha\le1$) specifies a first-order filter to smoothen the imbalance estimates.

In order to simplify the implementation, the residual IQ-imbalance may be expressed as $\Delta\rho=L_1/L_2$, and the combination of new and previous IQ-imbalance estimates may be calculated as $\hat{\rho}=(L_2\rho_0+L_1\alpha)/(L_2+L_1\rho^*_0\alpha)$. This may reduce the computational complexity since the division of equation (14) does not need to actually be performed.

FIG. 1 illustrates an example mobile terminal 110 connected, through a radio link 120, to a base station site 130. The base station site 130 comprises one or more antennas 135 and at least one base station 150. The mobile terminal 110 may comprise an arrangement for IQ-imbalance compensation according to embodiments of the invention.

The mobile terminal 110 is illustrated as a mobile telephone in a schematic front view. This example mobile terminal 110 comprises an antenna 111 mounted on the housing of the apparatus. Alternatively, the mobile terminal 110 may have an internal antenna mounted within the housing of the apparatus. The mobile terminal 110 may even comprise multiple antennas. The mobile terminal 110 may further comprise a display, a keypad, a loudspeaker, and a microphone, which together provides a man-machine interface for operating the mobile terminal 110.

The example mobile terminal 110 is adapted to connect to a mobile telecommunication network via the wireless link 120 to the radio base station 150. Hence, a user of the mobile terminal 110 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 110 and the base station 150 may be compliant with at least one mobile telecommunication standard employing OFDM, for instance UMTS LTE, IEEE 802.11a, IEEE 802.11g, and/or WiMAX (IEEE 802.16). Alternatively or additionally, the mobile terminal 110 may be adapted to connect to a digital broadcast system and to receive signals on accordance with at least one standard for digital broadcast employing OFDM, such as DVB-T, DVB-H, T-DMB and/or DAB.

Figure 2:
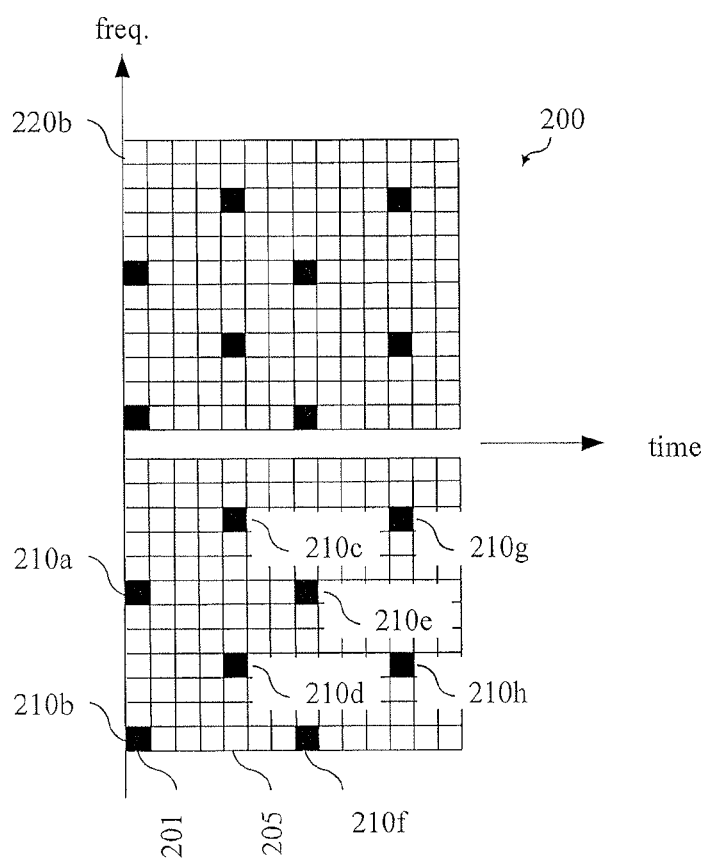
FIG. 2 is a diagram illustrating an example of pilot symbol placements in OFDM-signals.

FIG. 2 illustrates an example distribution of pilot symbols 210a-h within a time-frequency grid 200 of transmitted signals in an OFDM-system. Embodiments of the invention may be employed to estimate IQ-imbalance of a signal such as the one demonstrated in this figure. In FIG. 2, example OFDM-signals are illustrated before IFFT-processing in the transmitter. The corresponding time-frequency grid will be found in the receiver after FFT-processing.

In FIG. 2, it may be noted that pilot symbols 210a and 210b are transmitted in OFDM-symbol 201, that pilot symbols 210c and 210d are transmitted in OFDM-symbol 205, and that intermediate OFDM-symbols do not comprise any pilot symbols. Furthermore, it may be noted that pilot symbols 210a and 210b are transmitted on different sub-carriers compared to pilot symbols 210c and 210d. It may also be noted that in this example time-frequency grid 200 there are no pilot symbols on the mirror sub-carriers. For example, there is no pilot symbol on sub-carrier 220b, which is the mirror sub-carrier of pilot symbol 210b.

When performing channel estimation on a signal such as the one demonstrated in FIG. 2, the channel at the positions where there are pilot symbols available may first be estimated, using any known method for channel estimation. Thereafter, the channel may also be estimated at the other positions in the time-frequency grid. One way of performing this estimation is by means of interpolation in frequency and/or in time.

Figure 3:
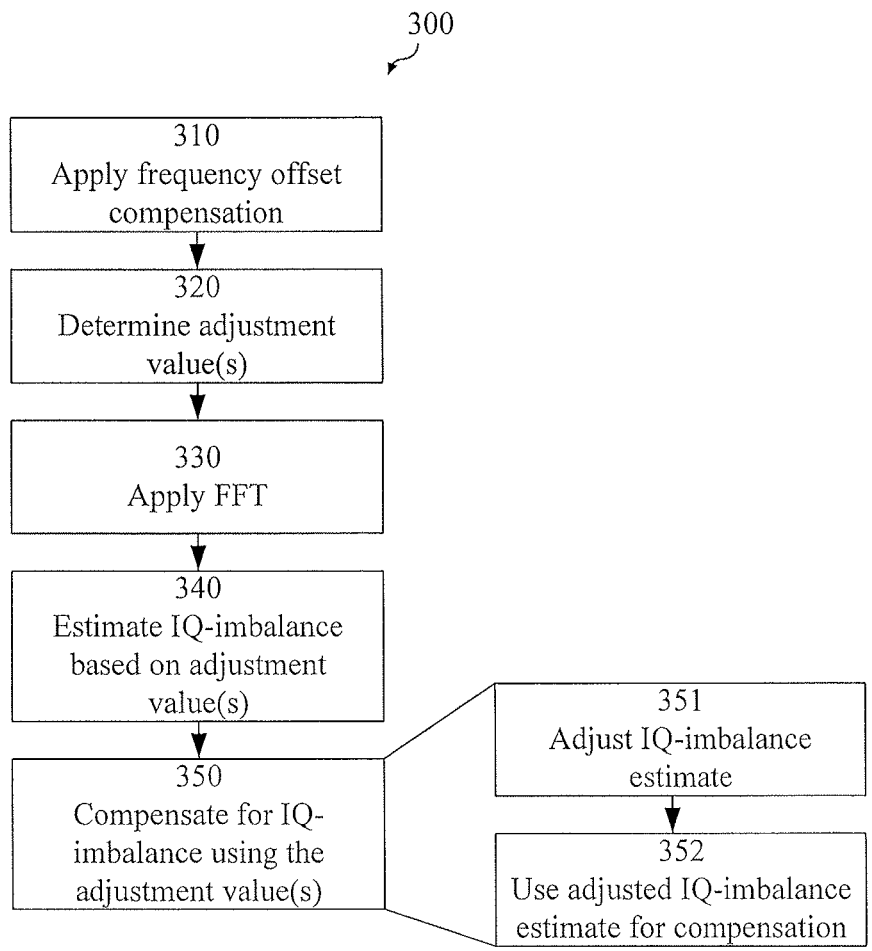
FIG. 3 is a flow chart illustrating example method steps according to some embodiments of the invention.

FIG. 3 illustrates an example method 300 according to some embodiments of the invention and suitable for use in an OFDM-receiver. In step 310, a received baseband OFDM-signal undergoes frequency offset compensation. For example, the received baseband OFDM-signal may pass a digital rotator, which rotates the received baseband OFDM-signal appropriately to produce a frequency offset compensated received signal.

In step 320, one or more adjustment values are determined. The one or more adjustment values are associated with the frequency offset compensation. The one or more adjustment values may differ between different OFDM-symbols. They may, for example, comprise twice the phase value used by a digital rotator in the frequency offset compensation for a particular sample of an OFDM-symbol.

In step 330, the frequency offset compensated received signal is transformed to the frequency domain by application of an FFT.

In step 340, the IQ-imbalance is estimated. The IQ-imbalance is estimated based at least on the pilot symbol of one or more frequency pairs, on the corresponding estimated channel value and on information related to the mirror frequency of the pilot symbol. The mirror frequencies may or may not comprise a pilot symbol. One or several frequency pairs may be used in the estimation. The frequency pairs may be picked from a single OFDM-symbol or from several OFDM-symbols. Further, the frequency pairs may comprise all available frequency pairs (corresponding to all available pilot symbols) in a time-frequency interval, or they may comprise only some of the available frequency pairs in the time-frequency interval.

The IQ-imbalance estimation in step 340 may utilize the one or more adjustment values determined in step 320. For example, the IQ-imbalance may be estimated as described in connection to equation (14) above.

Finally, in step 350, the IQ-imbalance estimate is used to compensate the received signal for the IQ-imbalance, either in the time domain or in the frequency domain. The IQ-imbalance compensation in step 350 may utilize the one or more adjustment values determined in step 320. For example, the IQ-imbalance may be compensated for as described in connection to any of the equations (13), (15), (16) or (17) above. If (15) or (16) are used, the IQ-imbalance estimate of step 340 may, for example, first be adjusted using the one or more adjustment values as illustrated in sub-step 351. Then, the adjusted IQ-imbalance estimate may be used (in sub-step 352) for IQ-imbalance compensation.

It is noted that the steps of the example method 300 may be performed in another order than what is illustrated in FIG. 3.

Figure 4A:
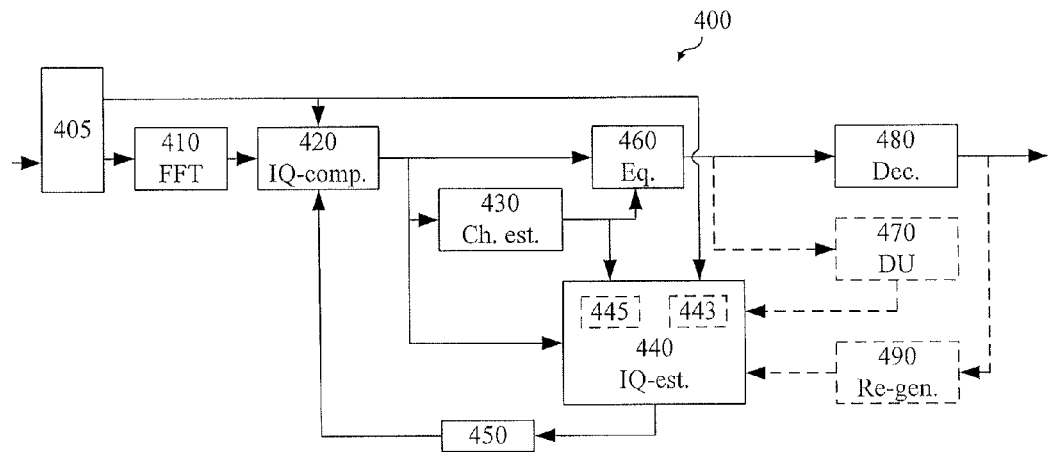
FIG. 4A is a block diagram illustrating an example arrangement according to some embodiments of the invention.

For example, the steps 340 and 350 may change place so that the IQ-compensation is done in accordance with a feedback approach as will be illustrated further in connection to FIG. 4A. Using a feedback approach, the step 350 may also be placed just before step 330 or just before step 310. In such cases, the IQ-imbalance compensation is performed in the time domain. If step 350 is placed before step 310, then step 350 does not use the adjustment values from step 320 as will be illustrated by FIG. 4C. This is because the IQ-imbalance compensation is not disturbed by the frequency offset compensation in step 310.

In yet some embodiments, step 340 may be placed just before step 330 or just before step 310 so that the IQ-imbalance estimation is performed in the time domain. If step 340 is placed before step 310, then step 340 does not use the adjustment values from step 320 because the IQ-imbalance estimation is not disturbed by the frequency offset compensation in step 310. In some situations, the IQ-imbalance may be constant or rather slowly varying. In such situations a possibility is to measure the IQ-imbalance once (e.g. in the factory, during or in connection to production or at each power on), and then there need not be any update of this estimate. That is, the received OFDM-signal is not used to estimate the IQ-imbalance and there is no estimator running continuously. Instead, the IQ-imbalance may be measured using a signal generated for this (and possibly other) purpose in the terminal. Such embodiments are also meant to be embraced by the above description.

In embodiments where step 340 is placed just before step 330, step 350 may, for example, be placed just before or just after step 340, after step 330 or just before step 310. In embodiments where step 340 is placed just before step 310, step 350 may, for example, be placed after step 330 or just before step 330.

FIG. 4A illustrates parts of an example arrangement 400 according to some embodiments of the invention. The arrangement may, for example perform method steps of the example method 300 as described in FIG. 3. The arrangement 400 may perform IQ-imbalance estimation and compensation according to embodiments of the invention, and may be comprised in an OFDM-receiver of an electronic communication device.

The arrangement 400 comprises a frequency synchronization and adjustment value calculation unit 405. The unit 405 may, for example comprise a frequency offset compensation unit, such as an automatic frequency control (AFC) unit, adapted to apply a frequency offset compensation to the received OFDM-signal to produce a frequency offset compensated received signal and determination circuitry adapted to determine one or more adjustment values associated with the frequency offset compensation. It is understood that the unit 405 may alternatively be implemented as two or more separate units performing different tasks of the unit 405.

To describe the operations of the unit 405 logically, it generates a constant length (e.g. a unit length) complex vector with a phase angle corresponding to the required frequency offset compensation, and multiplies a received OFDM-signal with the vector and thereby achieves frequency offset compensation. These operations may, for example, be performed by a digital rotator.

Before being fed to the frequency synchronization and adjustment value calculation unit 405, the received OFDM-signal may typically have been received by one or more antennas, and been filtered, down-converted, etc., in a receiver front end circuit.

The frequency synchronization and adjustment value calculation unit 405 also generates the one or more adjustment values. These values may also comprise a constant length complex vector with a phase angle related to the frequency offset compensation. Such vectors may be generated at suitable moments in time and fed to an IQ-compensation unit (IQ-comp.) 420 and an IQ-imbalance estimation unit (IQ-est.) 440. The suitable moments in time may, for example, be once every OFDM-symbol.

The arrangement 400 further comprises an FFT unit 410. The FFT unit 410 applies an FFT to the frequency offset compensated received OFDM-signal to transform it to the frequency domain.

The arrangement 400 also comprises the IQ-compensation unit (IQ-comp.) 420. In this embodiment, the IQ-compensation unit 420 performs compensation on the transformed signal (i.e. after the FFT 410) based on an IQ-imbalance estimate and the one or more adjustment values. In other embodiments, the IQ-compensation unit 420 may be located prior to the FFT 410. The IQ-imbalance estimate is received via a delay element 450 from the IQ-imbalance estimation unit (IQ-est.) 440. The IQ-imbalance estimate may be supplied as a value ($\hat{\rho}$). The one or more adjustment values are provided by unit 405.

The arrangement may further comprise a channel estimator (Ch. est.) 430 and an equalizer (Eq.) 460. After equalization, the received OFDM-signal may be forwarded to a decision unit (DU) 470 and/or a decoder (Dec.) 480.

The IQ-estimation unit 440 may be adapted to estimate the IQ-imbalance based on pilot symbols, estimated channel values and possibly on (implicitly or explicitly) estimated transmitted symbols as described before. The IQ-estimation unit 440 also uses the one or more adjustment values to estimate the IQ-imbalance. The one or more adjustment values are provided by unit 405. The estimated channel values may be received from the channel estimator 430 or they may be calculated in a channel value calculation unit 445 comprised in the IQ-imbalance estimation unit 440. If the transmitted symbols are not implicit in the IQ-imbalance estimation, the transmitted symbols may be estimated by circuitry 443 within the IQ-imbalance estimation unit 440. Alternatively, the transmitted symbols may be estimated by the decision unit 470 and fed to the IQ-imbalance estimation unit 440. Yet alternatively, the transmitted symbols may be estimated by re-generating, in re-generating circuitry (Re-gen.) 490, the supposedly transmitted signal based on the output from the decoder 480 and fed the result to the IQ-imbalance estimation unit 440.

FIG. 4A demonstrates a situation where the compensation is performed post-FFT in a feedback loop. Thus, the IQ-imbalance estimate is an estimate $\Delta\rho$ of the residual IQ-imbalance, which may be supplied as two values ($\hat{L}_1$ and $\hat{L}_2$) as explained before and could be combined with a previous IQ-imbalance estimate $\rho_0$ to improve the result.

In an alternative embodiment, the compensation is performed pre-FFT in a feedback loop, and block 420 is placed before block 410 in the receiver chain.

Figure 4B:
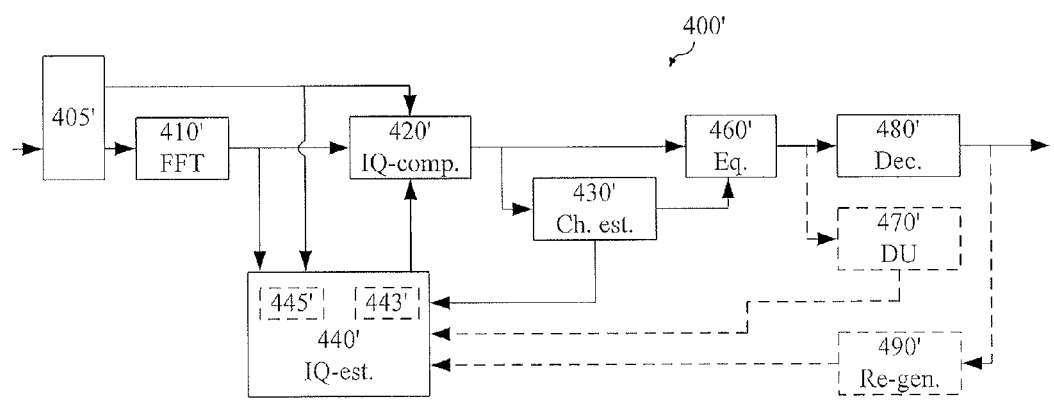
FIG. 4B is a block diagram illustrating an example arrangement according to some embodiments of the invention.

FIG. 4B illustrates parts of an example arrangement 400' according to some embodiments of the invention. The arrangement may, for example perform method steps of the example method 300 as described in FIG. 3. The arrangement 400' may perform IQ-imbalance estimation and compensation according to embodiments of the invention, and may be comprised in an OFDM-receiver of an electronic communication device.

The arrangement 400' comprises a frequency synchronization and adjustment value calculation unit 405', which operates similarly to the unit 405 described in connection to FIG. 4A.

Before being fed to the frequency synchronization and adjustment value calculation unit 405', the received OFDM-signal may typically have been received by one or more antennas, and been filtered, down-converted, etc., in a receiver front end circuit.

The arrangement 400' comprises an FFT unit 410'. The FFT unit 410' applies an FFT to the frequency offset compensated received OFDM-signal to transform it to the frequency domain.

The arrangement 400' further comprises an IQ-compensation unit (IQ-comp.) 420'. In this embodiment, the IQ-compensation unit 420' performs compensation on the transformed received OFDM-signal based on an IQ-imbalance estimate and the one or more adjustment values. The IQ-imbalance estimate is received from an IQ-imbalance estimation unit (IQ-est.) 440'. The one or more adjustment values are provided by unit 405'.

The arrangement may further comprise a channel estimator (Ch. est.) 430' and an equalizer (Eq.) 460'. After equalization, the received OFDM-signal may be forwarded to a decision unit (DU) 470' and/or a decoder (Dec.) 480'.

The IQ-estimation unit 440' may be adapted to estimate the IQ-imbalance based on pilot symbols, estimated channel values and possibly on (implicitly or explicitly) estimated transmitted symbols as described before. The IQ-estimation unit 440' also used the one or more adjustment values to estimate the IQ-imbalance. The one or more adjustment values are provided by unit 405'. The estimated channel values may be received from the channel estimator 430' or they may be calculated in a channel value calculation unit 445' comprised in the IQ-imbalance estimation unit 440'. If the transmitted symbols are not implicit in the IQ-imbalance estimation, the transmitted symbols may be estimated by circuitry 443' within the IQ-imbalance estimation unit 440'. Alternatively, the transmitted symbols may be estimated by the decision unit 470' and fed to the IQ-imbalance estimation unit 440'. Yet alternatively, the transmitted symbols may be estimated by re-generating, in re-generating circuitry (Re-gen.) 490', the supposedly transmitted signal based on the output from the decoder 480' and fed the result to the IQ-imbalance estimation unit 440'.

FIG. 4B demonstrates a situation where the compensation is performed post-FFT in a feed forward loop.

Figure 4C:
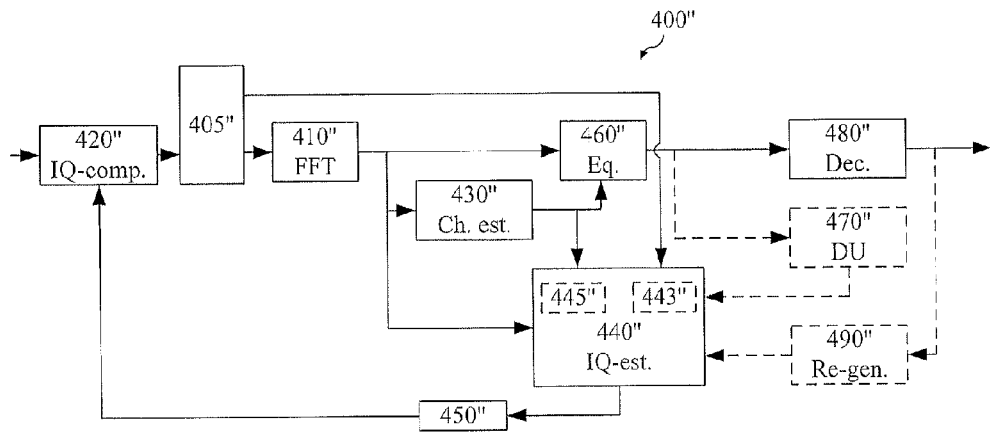
FIG. 4C is a block diagram illustrating an example arrangement according to some embodiments of the invention.

FIG. 4C illustrates parts of an example arrangement 400" according to some embodiments of the invention. The arrangement may, for example perform method steps of the example method 300 as described in FIG. 3. The arrangement 400" may perform IQ-imbalance estimation and compensation according to embodiments of the invention, and may be comprised in an OFDM-receiver of an electronic communication device.

The arrangement 400" comprises a frequency synchronization and adjustment value calculation unit 405", an FFT unit 410", a channel estimator (Ch. est.) 430", an IQ-estimation unit 440", a delay element 450", an equalizer (Eq.) 460", a decoder (Dec.) 480", and may comprise circuitry 443", a channel value calculation unit 445", a decision unit (DU) 470" and/or re-generating circuitry (Re-gen.) 490", which may all operate similarly to the corresponding units described in connection to FIG. 4A.

The arrangement 400" also comprises the IQ-compensation unit (IQ-comp.) 420". In this embodiment, the IQ-compensation unit 420" performs compensation before the frequency offset compensation, and based on an IQ-imbalance estimate. Since the IQ-imbalance compensation is performed before the frequency offset compensation, the IQ-compensation unit 420" does not use the one or more adjustment values. The IQ-imbalance estimate is received via delay element 450" from the IQ-imbalance estimation unit (IQ-est.) 440".

FIG. 4C demonstrates a situation where the compensation is performed pre-FFT and pre-AFC in a feedback loop. Thus, the IQ-imbalance estimate is an estimate $\Delta\rho$ of the residual IQ-imbalance, which may be supplied as two values ($\hat{L}_1$ and $\hat{L}_2$) as explained before and could be combined with a previous IQ-imbalance estimate $\rho_0$ to improve the result.

In the arrangement illustrated in FIG. 4C, the IQ-imbalance compensation unit 420" may be adapted to perform the compensation in the analog or in the digital domain. In some embodiments, the IQ-imbalance compensation unit 420" and possibly unit 405" may be comprised in a radio circuit.

Further variations to the placement of the IQ-imbalance estimation unit and the IQ-imbalance compensation unit may be envisioned based on the variations of the ordering of method steps that were described in connection to FIG. 3.

The one or more adjustment values, e.g. the complex value $\theta_{(s)}$, which may be used in the IQ-imbalance estimation and/or compensation, may be generated in different ways. The complex value $\theta_{(s)}$ may correspond to a unit vector with twice the phase of the first sample of each OFDM-symbol. If the adjustment value is calculated in hardware it may be desirable to avoid implementing an additional digital rotator for the adjustment value generation. Instead it may be desirable to utilize the digital rotator used for frequency offset compensation.

Typically, the digital rotator rotates each received sample before the FFT-application. Thus, the digital rotator may be used once every sample. According to some embodiments of the invention, a sample from the cyclic prefix (CP) of a current OFDM-symbol or of a subsequent OFDM-symbol may be excluded from the frequency offset compensation. During that sample, the digital rotator may be used to calculate the adjustment value (or a value related to the adjustment value)

instead, e.g. by rotating a "1" (or any other real or close to real constant) a desired angle in the complex plane.

The desired rotation for generating $\theta_{(s)}$ may be twice the rotation phase of a particular sample, such as the first sample of an OFDM-symbol. This rotation can be achieved either by rotating the constant ("1") by the double argument compared to the rotation phase of the first sample of an OFDM-symbol or by rotating the constant ("1") by the rotation phase of the first sample of an OFDM-symbol and squaring the result.

Figure 4D:
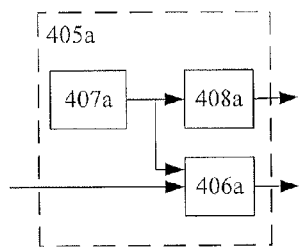
FIG. 4D is a block diagram illustrating an example arrangement according to some embodiments of the invention.
Figure 4E:
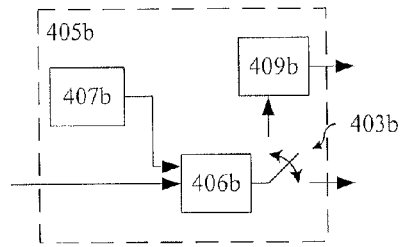
FIG. 4E is a block diagram illustrating an example arrangement according to some embodiments of the invention.
Figure 4F:
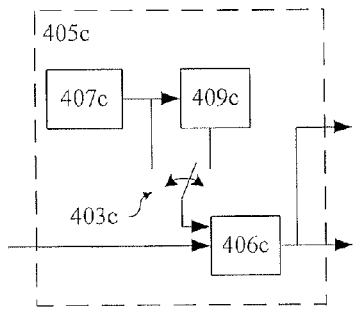
FIG. 4F is a block diagram illustrating an example arrangement according to some embodiments of the invention.

FIGS. 4D-F describe examples of different alternative implementations 405a, 405b, 405c of frequency synchronization and adjustment value calculation units 405, 405' and 405" of FIGS. 4A-C respectively. Any of the alternatives of FIGS. 4D-F may be used in any of the units 405, 405' and 405".

In FIG. 4D, the received OFDM-signal is input to a digital rotator 406a performing frequency offset compensation. The digital rotator is also fed a phase ramp signal from a phase ramp generator 407a. The phase ramp is also fed to an adjustment value calculation unit 408a, which calculates a complex number using one or more values of the phase ramp signal. For example, an adjustment value may be calculated as a constant (e.g. unit) length vector having a phase corresponding to a phase ramp value multiplied by two.

In FIG. 4E, the received OFDM-signal is input to a digital rotator 406b performing frequency offset compensation. The digital rotator is also fed a phase ramp signal from a phase ramp generator 407b. At suitable moments in time, the digital rotator is adapted to produce a complex number related to the one or more adjustment values by using one or more values of the phase ramp signal as will be explained in connection to FIG. 5A-B. For example, the complex number may be calculated as a constant (e.g. unit) length vector having a phase corresponding to a phase ramp value. At these moments in time, the output from the digital rotator 406b is feed to a phase doubling unit 409b by changing the setting of the switch 403b. The phase doubling unit thus produces an adjustment value, which is a complex number having the same length but the double phase compared to the complex number produced by the digital rotator 406b. This may, for example, be achieved by a squaring operation.

In FIG. 4F, the received OFDM-signal is input to a digital rotator 406c performing frequency offset compensation. The digital rotator is also fed a phase ramp signal from a phase ramp generator 407c. At suitable moments in time, the digital rotator is fed a double phase angle from phase doubling unit 409c instead of the phase ramp, by changing the setting of the switch 403c. At these moments in time, the digital rotator operates on a real or close to real constant (such as a "1") instead of on the input signal (similarly to the operations that will be described in connection to the constant 504 of FIG. 5A). The digital rotator thus produces an adjustment value, which is a complex number having constant length and the double phase compared to the phase ramp value.

Figure 5A:
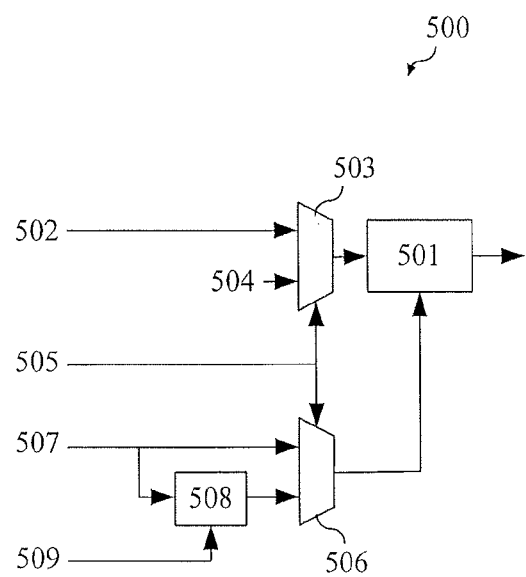
FIG. 5A is a block diagram illustrating an example arrangement according to some embodiments of the invention.
Figure 5B:
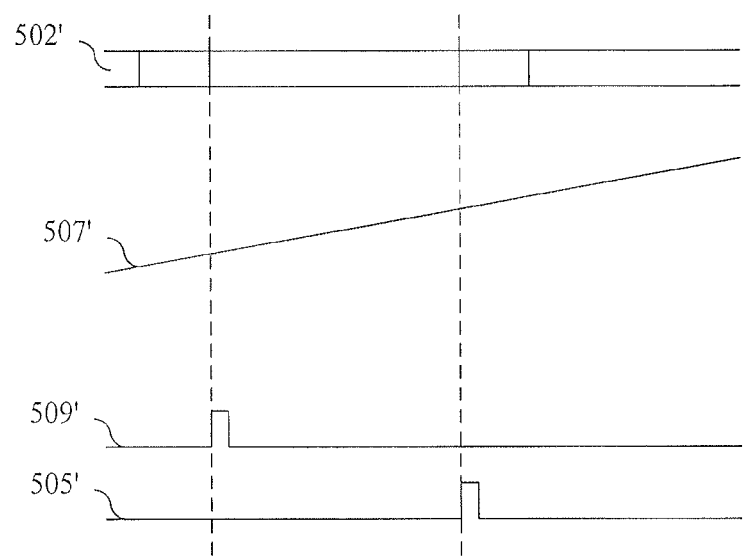
FIG. 5B is a signaling diagram illustrating example input and control signals to the example arrangement of FIG. 5A according to some embodiments of the invention.

FIG. 5A illustrates an example implementation of an adjustment value generation unit 500. FIG. 5B illustrates example corresponding input signals to the adjustment value generation unit 500. The adjustment value generation unit 500 may, for example, be implemented in block 406b of FIG. 4E. The adjustment value generation unit 500 comprises a digital rotator 501. In normal operation, the digital rotator appropriately rotates a received signal 502, 502' using a phase ramp 507, 507' to achieve frequency offset compensation. The switches 503 and 506 are set to pass the received signal 502, 502' and the phase ramp 507, 507' respectively to the digital rotator 501.

At some suitable moment in time, a control signal 505, 505' triggers the switches 503 and 506. Thus, the switch 503 is momentarily set to pass a real or close to real constant 504 (such as a "1") to the digital rotator 501. The switch 506 is set to pass a delayed version of the phase ramp to the digital rotator 501. Thus, the digital rotator rotates the constant (e.g. "1") by an angle corresponding to a value of the phase ramp chosen by the delay value. The resulting rotated constant is output from the digital rotator 501 and may be used to produce the one or more adjustment values, for example by a squaring operation as explained in connection to FIG. 4E. The suitable moment in time may, for example, be during a sample of a cyclic prefix (CP) of the current or following OFDM-symbol. The control signal 505, 505' may reset the switches 503 and 506 to pass the received signal 502, 502' and the phase ramp 507, 507' respectively for the following sample.

The delay value used for producing the delayed version of the phase ramp is determined by a time difference between the control signal 505, 505' and a register control signal 509, 509'. The register control signal 509, 509' may, at some suitable moment in time, trigger a register 508 to hold a sample of the phase ramp 507, 507'. The suitable moment in time may, for example, be at the beginning of the payload part of an OFDM-symbol. The register content is then passed, as the delayed version of the phase ramp, by the switch 506 to the digital rotator 501 as explained above.

Figure 6:
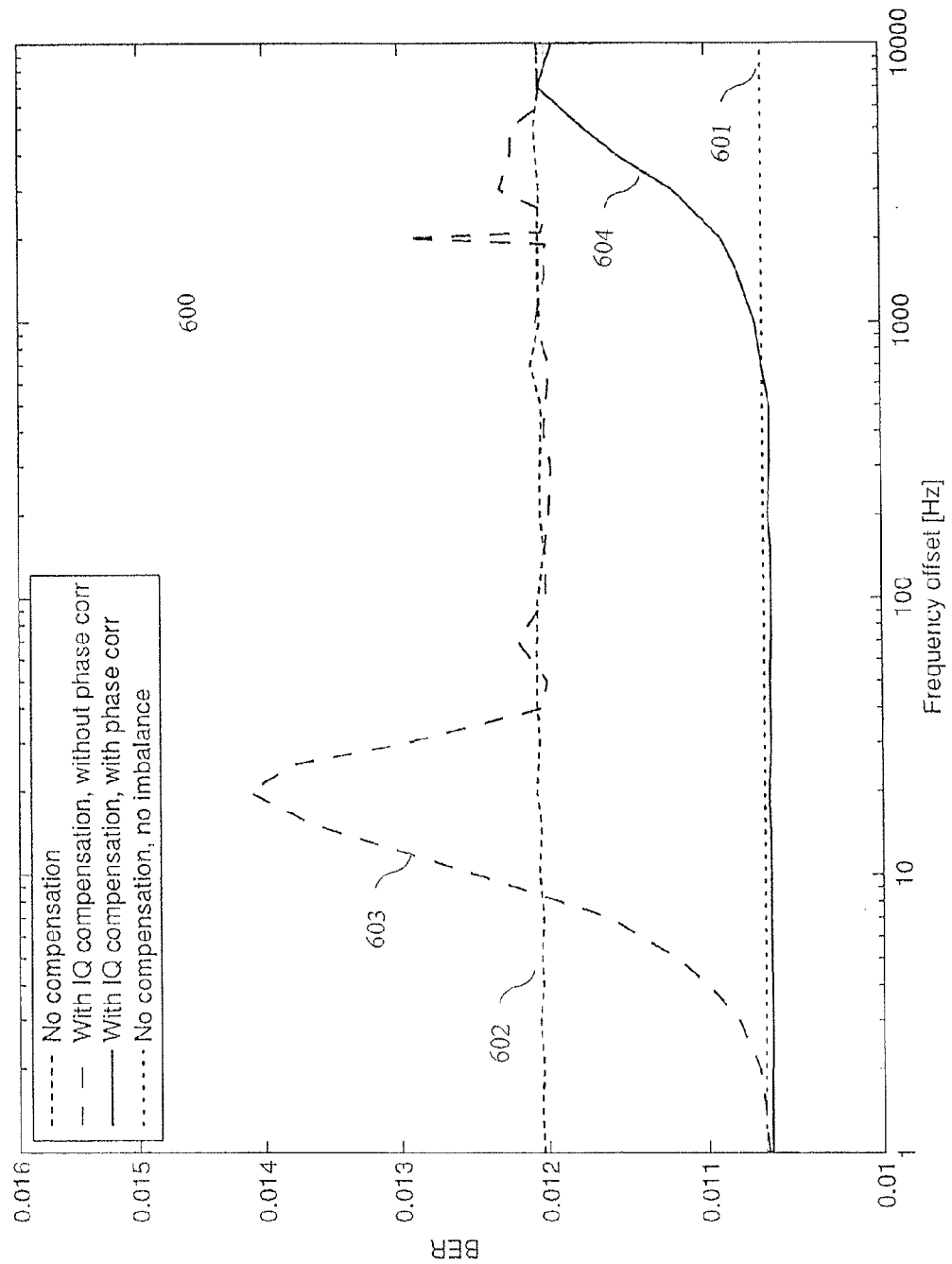
FIG. 6 is a plot illustrating advantages of applying some embodiments of the invention.

FIG. 6 is a plot 600 showing the performance of different IQ-imbalance estimation and compensation approaches to illustrate advantages of embodiments of the invention. The resulting bit error rate (BER) is shown as a function of the frequency offset. The simulated channel is an additive white Gaussian noise (AWGN) channel with 20 dB signal-to-noise ratio (SNR). In the simulations, it is assumed that the frequency offset is accurately estimated, that the IQ-imbalance has a 0.35 dB gain imbalance and a 1-degree phase imbalance.

In the plot 600, the ideal BER, i.e. when either the IQ-imbalance is perfectly estimated and compensated for or no IQ-imbalance is present and no IQ-imbalance compensation is performed, is shown by the curve 601. The result if no IQ-imbalance compensation is applied is shown by the curve 602. The curve 603 shows the result if IQ-imbalance compensation is applied but neither the IQ-imbalance estimation nor the IQ-imbalance compensation are adjusted for the frequency offset compensation. The curve 604 shows the result if IQ-imbalance compensation is applied and both the IQ-imbalance estimation and the IQ-imbalance compensation are adjusted for the frequency offset compensation according to embodiments of the invention.

From FIG. 6 it can be seen that when no compensating for the frequency offset compensation is done to the IQ-imbalance algorithms (curve 603), the BER starts do increase already at low frequency offsets. It can also be seen that at some point (approximately at 10 Hz frequency offset in this example) the gain from applying IQ-imbalance compensation is lost. The BER may even get worse than without IQ-imbalance compensation (curve 602). At which frequency offset the curves 602 and 603 will cross each other may depend on the length of the time interval used for IQ-imbalance estimation.

The curve 604, showing BER when the IQ-imbalance estimation and compensation are adjusted for the frequency offset rotation according to embodiments of the invention, reveals a situation corresponding to an IQ-imbalance free situation (curve 601) up to a frequency offset of approximately 1 kHz. The BER starts to increase for larger frequency offsets due to inter-carrier interference (ICI), since the approximation in equation (6) is not valid for such high frequency offsets. To make the algorithm robust for higher frequency offsets, more frequencies from the sum in equation (5) may be used in the estimation and/or compensation.

In some embodiments, the arrangements and methods described above may be applied in MIMO receivers. In such embodiments, the described IQ-imbalance estimation and/or IQ-imbalance compensation techniques may be applied to each MIMO stream separately.

The described embodiments of the invention and their equivalents may be performed in hardware or software or in a combination of both hardware and software.

Embodiments of the invention may be performed by general-purpose circuits associated with or integral to a receiver, such as digital signal processors (DSP), central processing units (CPU), co-processor units, or by specialized circuits such as for example application-specific integrated circuits (ASIC). The digital rotator may be implemented using a CORDIC (COordinate Rotation DIgital Computer) algorithm. All such forms are contemplated to be within the scope of the invention.

Embodiments of the invention may be implemented within an electronic apparatus comprising a receiver chain having arrangements or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaining device, or a (wrist) watch. The electronic apparatus may alternatively be a base station in a communication system.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the mobile terminal 110. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the method shown in FIG. 3.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method implemented in a communication receiver for processing a received Orthogonal Frequency Division Multiplexing (OFDM) wireless communication signal, the method comprising:
    applying frequency offset compensation to produce a frequency offset compensated received signal, wherein the frequency offset compensation comprises digital rotation;
    determining one or more adjustment values associated with the frequency offset compensation, wherein each of the one or more adjustment values is a complex number associated with an OFDM-symbol of the received OFDM signal, wherein the complex number is a doubling of the phase of the digital rotation corresponding to a particular sample of the OFDM-symbol;
    transforming the frequency offset compensated received signal to a frequency domain, wherein the frequency domain comprises a plurality of sub-carrier frequencies;
    estimating an in-phase/quadrature imbalance (IQ-imbalance) based on at least the one or more adjustment values, one or more pieces of information related to a first symbol of a first sub-carrier frequency, and one or more pieces of information related to a second symbol of a second sub-carrier frequency, wherein the second sub-carrier frequency is a mirror sub-carrier frequency to the first sub-carrier frequency, said estimating comprising multiplication with a conjugate function of the complex number; and
    performing IQ-imbalance compensation of the received OFDM signal based on the estimated IQ-imbalance.

2. The method of claim 1, wherein performing IQ-imbalance compensation comprises:
    adjusting the estimated IQ-imbalance based on the one or more adjustment values; and
    performing the IQ-imbalance compensation based on the adjusted estimated IQ-imbalance.

3. The method of claim 1, wherein estimating the IQ-imbalance comprises:
    determining estimated channel values for at least the first sub-carrier frequency, the first sub-carrier frequency having a pilot symbol; and
    estimating the IQ-imbalance based on at least:
        the one or more pieces of information related to the first symbol, the one or more pieces of information comprising: the pilot symbol, and the at least one determined estimated channel value,
        the one or more pieces of information related to the second symbol, and
        at least one of the one or more adjustment values.

4. The method of claim 1, wherein estimating the IQ-imbalance comprises estimating the IQ-imbalance based on one or more pieces of information related to a number of symbols of sub-carrier frequencies that are neighboring sub-carrier frequencies to the mirror sub-carrier frequency.

5. The method of claim 1, wherein estimating the IQ-imbalance comprises estimating the IQ-imbalance based on a plurality of pilot symbols and one or more pieces of information related to symbols of corresponding mirror sub-carrier frequencies.

6. The method of claim 1, wherein determining the one or more adjustment values comprises using a digital rotator to generate the complex number during a cyclic prefix of the associated OFDM-symbol or of an adjacent OFDM-symbol.

7. A computer program product stored on a non-transitory computer readable medium and comprising program instructions that, when executed by a data-processing unit associated with a communication receiver, cause the communication receiver to process a received Orthogonal Frequency Division Multiplexing (OFDM) wireless communication signal, the program instructions causing the communication receiver to:
  apply frequency offset compensation to produce a frequency offset compensated received signal, wherein the frequency offset compensation comprises digital rotation;
  determine one or more adjustment values associated with the frequency offset compensation, wherein each of the one or more adjustment values is a complex number associated with an OFDM-symbol of the received OFDM signal, wherein the complex number is a doubling of the phase of the digital rotation corresponding to a particular sample of the OFDM-symbol;
  transform the frequency offset compensated received signal to a frequency domain, wherein the frequency domain comprises a plurality of sub-carrier frequencies;
  estimate an in-phase/quadrature imbalance (IQ-imbalance) based on at least the one or more adjustment values, one or more pieces of information related to a first symbol of a first sub-carrier frequency, and one or more pieces of information related to a second symbol of a second sub-carrier frequency, wherein the second sub-carrier frequency is a mirror sub-carrier frequency to the first sub-carrier frequency, said estimating comprising multiplication with a conjugate function of the complex number; and
  perform IQ-imbalance compensation of the received OFDM signal based on the estimated IQ-imbalance.

8. An arrangement for processing a received Orthogonal Frequency Division Multiplexing (OFDM) wireless communication signal, the arrangement comprising:
  a frequency offset compensation circuit comprising a digital rotator, the frequency offset compensation unit configured to apply a frequency offset compensation to the received OFDM signal to produce a frequency offset compensated received signal;
  determination circuitry configured to determine one or more adjustment values associated with the frequency offset compensation, by determining each of the one or more adjustment values as a complex number associated with an OFDM-symbol of the received OFDM signal, wherein the complex number is a doubling of the phase of the digital rotation corresponding to a particular sample of the OFDM-symbol;
  a fast Fourier transform circuit configured to transform the frequency offset compensated received signal to a frequency domain, wherein the frequency domain comprises a plurality of sub-carrier frequencies;
  an in-phase/quadrature imbalance (IQ-imbalance) estimator circuit configured to estimate an IQ-imbalance based on at least the one or more adjustment values, one or more pieces of information related to a first symbol of a first sub-carrier frequency, and one or more pieces of information related to a second symbol of a second sub-carrier frequency, wherein the second sub-carrier frequency is a mirror sub-carrier frequency to the first sub-carrier frequency, said estimating comprising multiplication with a conjugate function of the complex number; and
  an IQ-imbalance compensation circuit configured to perform IQ-imbalance compensation of the received OFDM signal based on the estimated IQ-imbalance.

9. The arrangement of claim 8, wherein the IQ-imbalance compensation circuit is configured to:
  adjust the estimated IQ-imbalance based on the one or more adjustment values; and
  perform the IQ-imbalance compensation based on the adjusted estimated IQ-imbalance.

10. The arrangement of claim 8,
  further comprising a channel estimator circuit configured to determine estimated channel values for at least the first sub-carrier frequency, the first sub-carrier frequency having a pilot symbol; and
  wherein the IQ-imbalance estimator circuit is configured to estimate the IQ-imbalance based on at least:
    the one or more pieces of information related to the first symbol, the one or more pieces of information comprising: the pilot symbol, and the at least one determined estimated channel value,
    the one or more pieces of information related to the second symbol, and
    at least one of the one or more adjustment values.

11. The arrangement of claim 8, wherein the IQ-imbalance estimator circuit is further configured to estimate the IQ-imbalance based on one or more pieces of information related to a number of symbols of sub-carrier frequencies that are neighboring sub-carrier frequencies to the mirror sub-carrier frequency.

12. The arrangement of claim 8, wherein the IQ-imbalance estimator circuit is configured to estimate the IQ-imbalance based on a plurality of pilot symbols and one or more pieces of information related to symbols of corresponding mirror sub-carrier frequencies.

13. An electronic communication device comprising a wireless communication receiver that includes an arrangement for processing a received Orthogonal Frequency Division Multiplexing (OFDM) wireless communication signal, the arrangement comprising:
  a frequency offset compensation circuit comprising a digital rotator, the frequency offset compensation circuit configured to apply a frequency offset compensation to the received OFDM signal to produce a frequency offset compensated received signal;
  determination circuitry configured to determine one or more adjustment values associated with the frequency offset compensation, by determining each of the one or more adjustment values as a complex number associated with an OFDM-symbol of the received OFDM-signal, wherein the complex number is a doubling of the phase of the digital rotation corresponding to a particular sample of the OFDM-symbol;
  a fast Fourier transform circuit configured to transform the frequency offset compensated received signal to a frequency domain, wherein the frequency domain comprises a plurality of sub-carrier frequencies;
  an in-phase/quadrature imbalance (IQ-imbalance) estimator circuit configured to estimate an IQ-imbalance based on at least the one or more adjustment values, one or more pieces of information related to a first symbol of a first sub-carrier frequency, and one or more pieces of information related to a second symbol of a second sub-carrier frequency, wherein the second sub-carrier frequency is a mirror sub-carrier frequency to the first sub-carrier frequency, said estimating comprising multiplication with a conjugate function of the complex number; and
an IQ-imbalance compensation circuit configured to perform IQ-imbalance compensation of the received OFDM signal based on the estimated IQ-imbalance.

* * * * *

UNITED STATES PATENT AND TRADEMARK OFFICE
CERTIFICATE OF CORRECTION

PATENT NO. : 8,594,212 B2
APPLICATION NO. : 13/001726
DATED : November 26, 2013
INVENTOR(S) : Andgart et al.

It is certified that error appears in the above-identified patent and that said Letters Patent is hereby corrected as shown below:

In the Specification

Column 7, Line 42, in Equation (3), delete "$y^{IQ}[n] = y[n] + \rho \exp(j2\pi(2\hat{\upsilon}(n+m_s)/N)y^*[n],$" and insert -- $y^{IQ}[n] = y[n] + \rho \exp(j2\pi(2\hat{\upsilon})(n+m_x)/N) \, y^*[n]$, --, therefor.

Column 8, Line 6, delete "$(|\hat{\upsilon}|<<1),$" and insert -- $(|\hat{\upsilon}| << 1 ),$ --, therefor.

Column 9, Line 36, after Equation (9), insert -- . --, therefor.

Signed and Sealed this
Twenty-ninth Day of July, 2014

Michelle K. Lee
*Deputy Director of the United States Patent and Trademark Office*